(12) United States Patent
Windle

(10) Patent No.: US 8,342,818 B2
(45) Date of Patent: Jan. 1, 2013

(54) WAVE POWERED PUMPING APPARATUS

(76) Inventor: Tommy J. Windle, Bartlesville, OK (US)

(*) Notice: Subject to any disclaimer, the term of this patent is extended or adjusted under 35 U.S.C. 154(b) by 0 days.

(21) Appl. No.: 13/179,303

(22) Filed: Jul. 8, 2011

(65) Prior Publication Data

US 2011/0268591 A1 Nov. 3, 2011

Related U.S. Application Data

(62) Division of application No. 11/862,031, filed on Sep. 26, 2007, now Pat. No. 8,007,252.

(51) Int. Cl.
*F04B 17/00* (2006.01)
*F03B 13/18* (2006.01)

(52) U.S. Cl. ............... 417/331; 60/497; 60/504; 60/505

(58) Field of Classification Search .......... 417/331–333; 60/397, 497, 498, 504, 505

See application file for complete search history.

(56) References Cited

U.S. PATENT DOCUMENTS

| 644,093 | A | * | 2/1900 | Place | 417/331 |
|---|---|---|---|---|---|
| 4,754,157 | A | * | 6/1988 | Windle | 290/53 |
| 5,394,695 | A | * | 3/1995 | Sieber | 60/398 |
| 5,701,740 | A | * | 12/1997 | Tveter | 60/505 |
| 7,076,949 | B2 | * | 7/2006 | Fernandez Gomez et al. | 60/498 |
| 8,007,252 | B2 | * | 8/2011 | Windle | 417/331 |

* cited by examiner

*Primary Examiner* — Charles Freay
(74) *Attorney, Agent, or Firm* — Hovey Williams LLP

(57) ABSTRACT

An apparatus is disclosed for an improved float type wave powered pump that uses the continuous rising and falling wave action in a body of water to pump a fluid. The pump includes piston and cylinder assemblies that are configured for relative reciprocal movement therebetween. One of the assemblies is anchored to the floor of the body of water and the other is vertically moveable in response to a drive float riding on a wave. The pump selectively includes a tide compensating device to reduce the ratio of vertical travel of the drive float to vertical travel of the moveable assembly. The pump also selectively includes a fluid inlet check valve incorporating a support plate of the piston assembly with openings therein and a cover for the same. The pump further selectively includes a directional pressure-activated seal at the point of sliding connection between the piston rod and the cylinder.

20 Claims, 7 Drawing Sheets

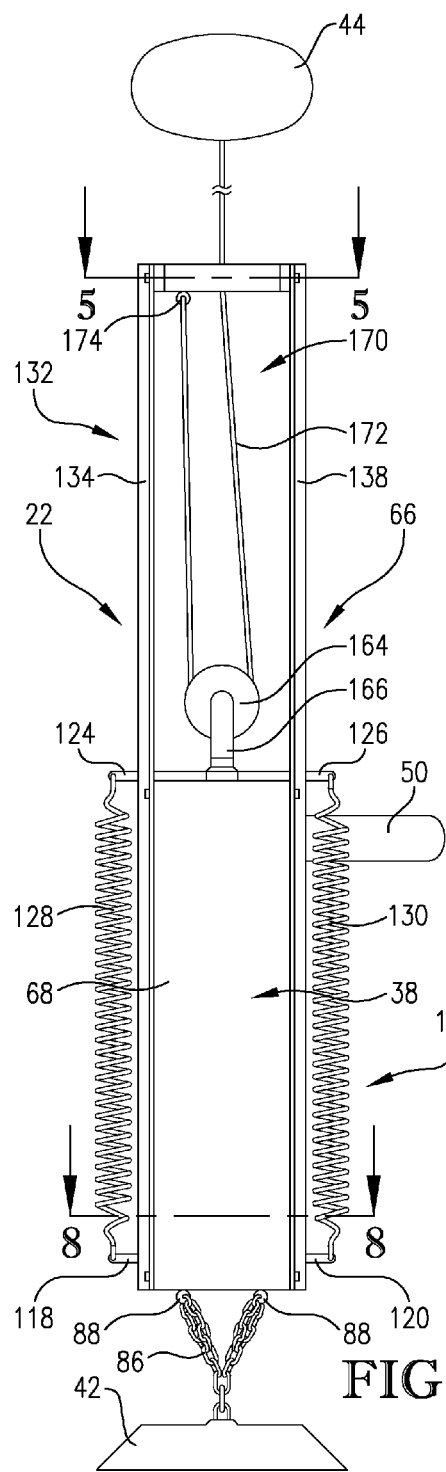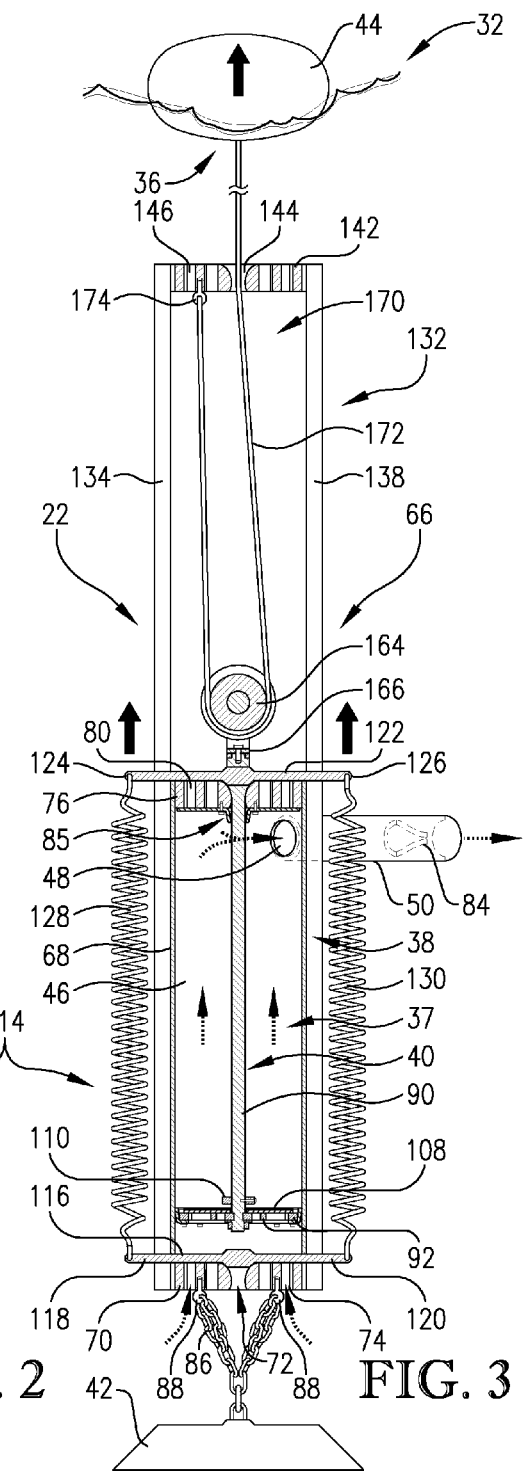

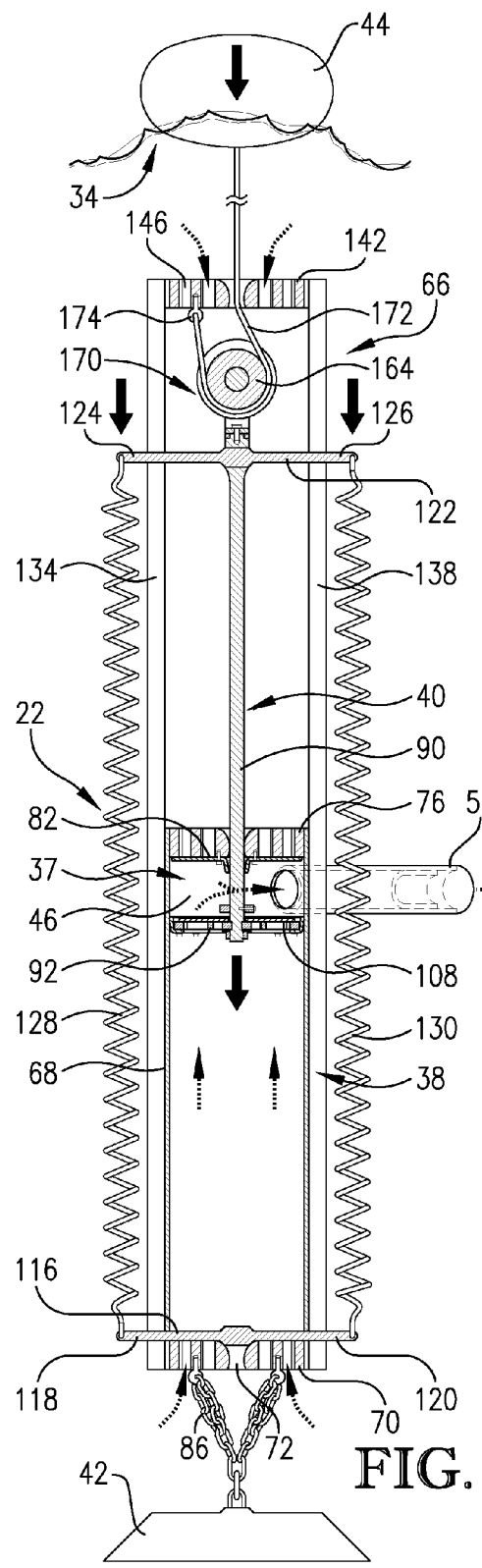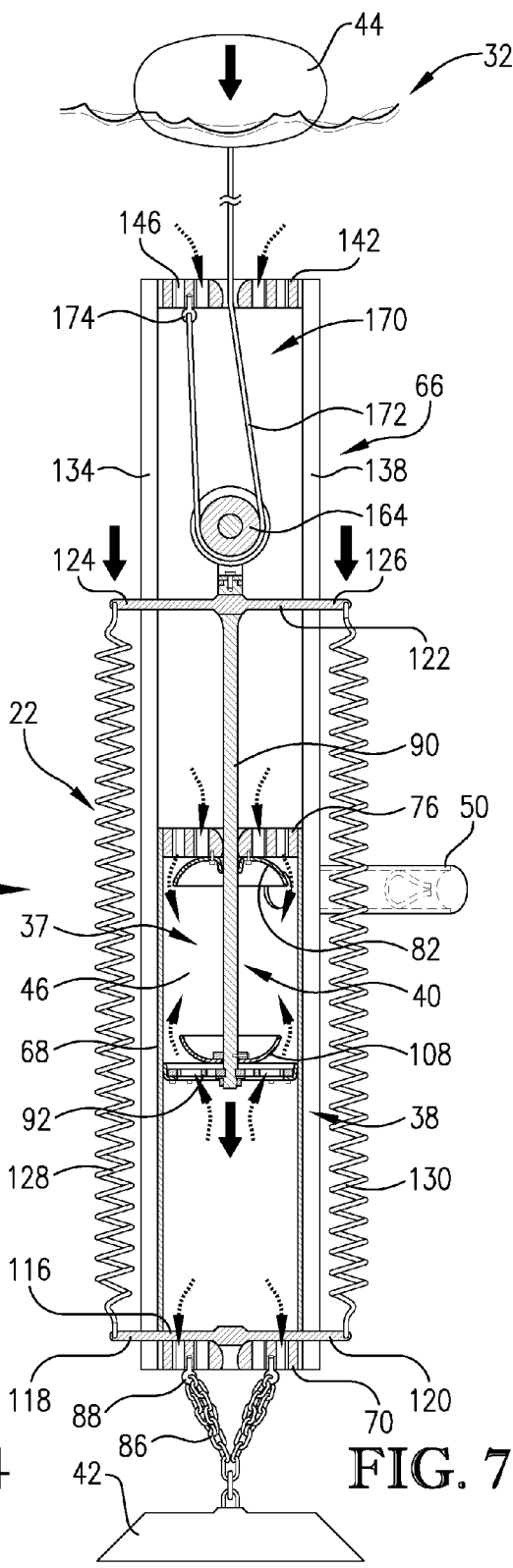

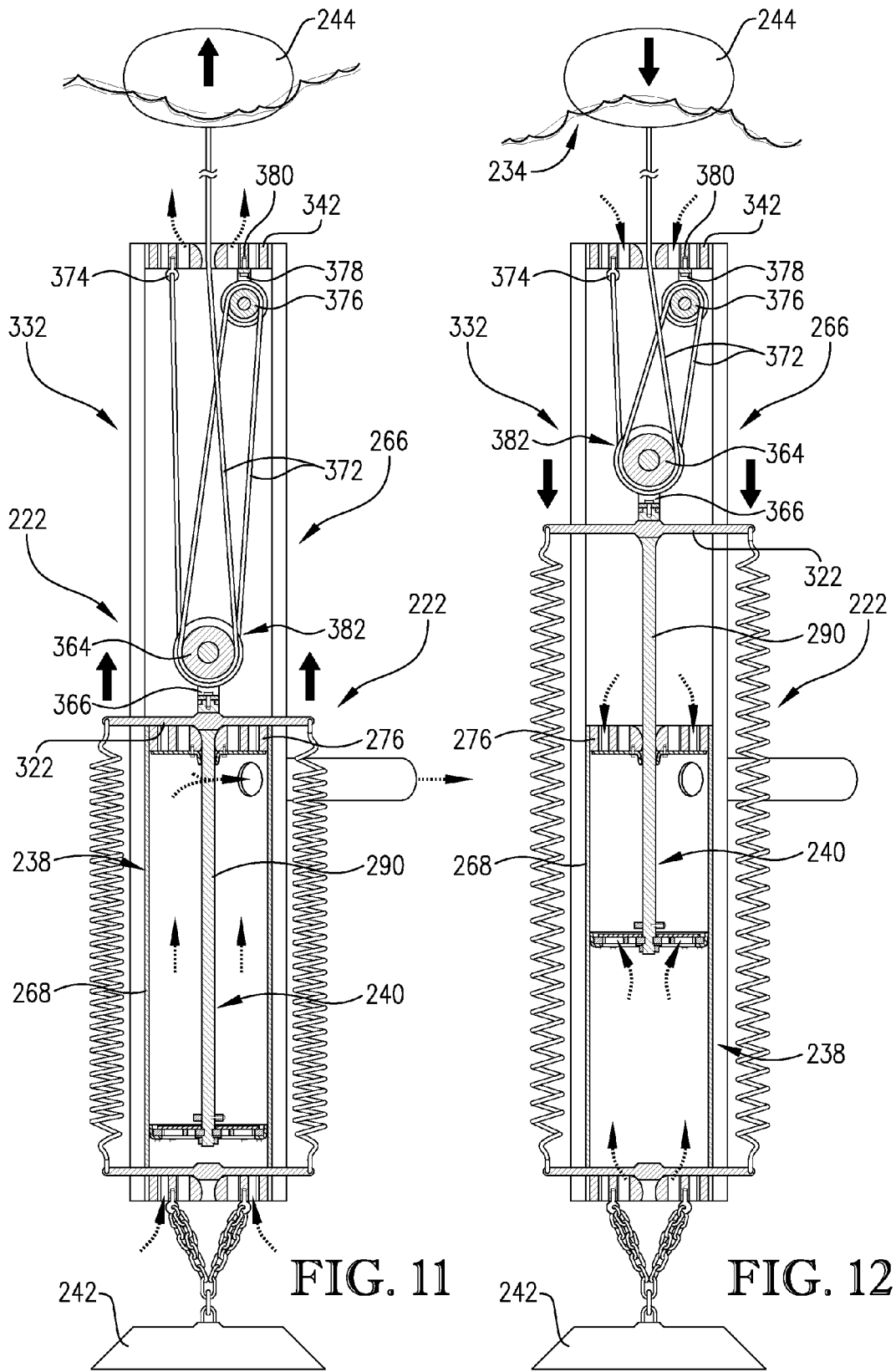

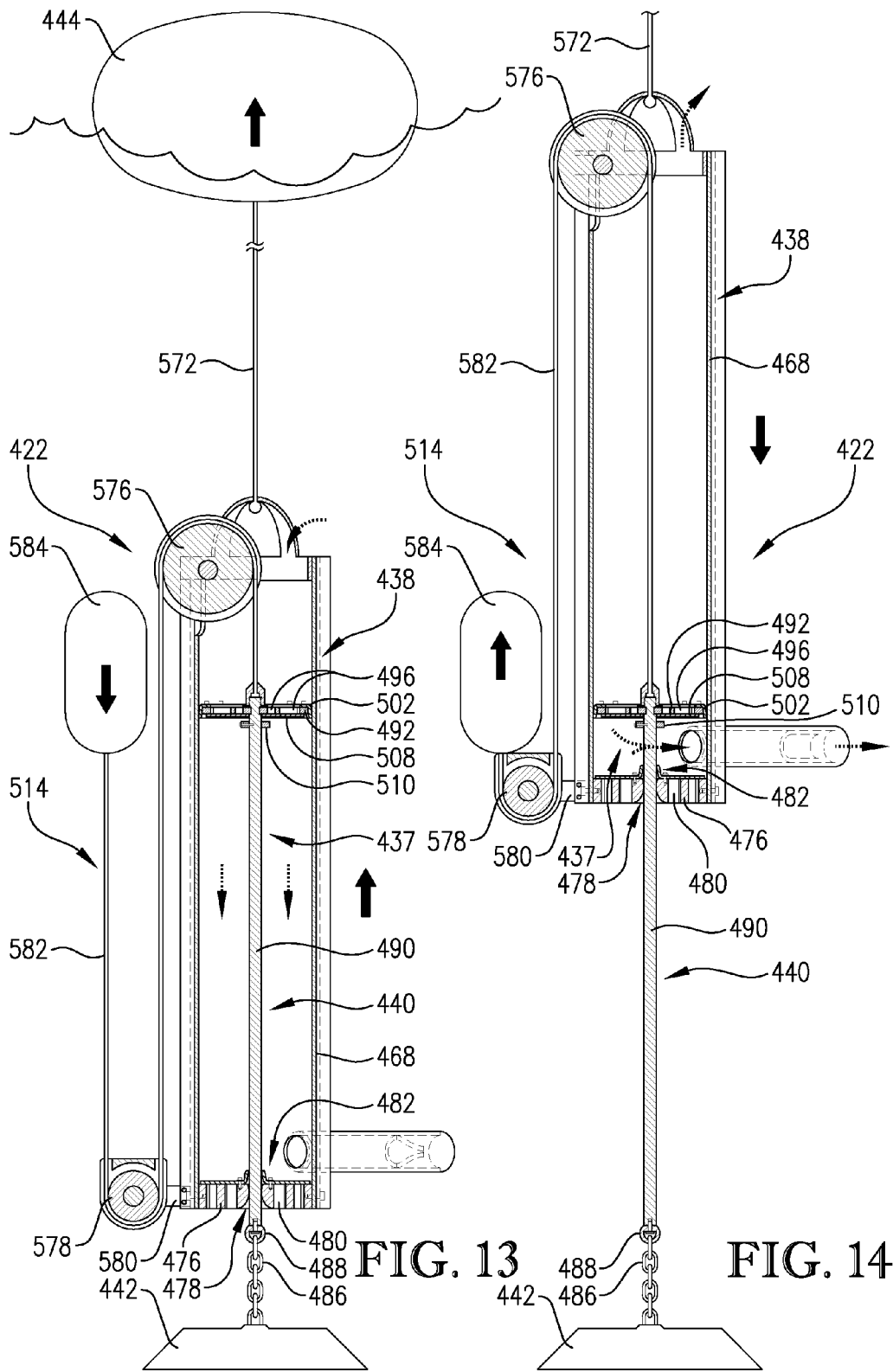

WAVE POWERED PUMPING APPARATUS

CROSS-REFERENCE TO RELATED APPLICATION(S)

The present application is a divisional application of co-pending, identically-titled U.S. patent application Ser. No. 11/862,031, filed Sep. 26, 2007, which is hereby incorporated by reference herein.

BACKGROUND

1. Field

Embodiments of the present invention relate generally to float type wave powered pumping devices that use the continuous rising and falling wave action in a body of water to pump a fluid.

2. Discussion of the Prior Art

Those of ordinary skill in the art will appreciate that conventional wave powered pumps are typically used in large bodies of water, such as the ocean or the sea, where the operating environment often dictates that the pumps are working in an unsupervised state for long periods of time. Those of ordinary skill in the art will also appreciate that it is desirable for such wave powered pumps to move large quantities of fluid in order to be most productive. Conventionally, large and complex pumps are used in an effort to meet these demands. While this typical construction has been satisfactory in some respects, the complexity of the pumps reduces their appeal and often introduces inefficiencies into the system due to the amount of components involved. Additionally, conventional wave powered pumps suffer from durability issues as many of the components are prone to fail by component breakage or deformation in the unsupervised operation state in the ocean.

SUMMARY

According to one aspect of the present invention, an apparatus is provided for pumping a fluid using the continuous rising and falling wave action in a body of water, the apparatus including a cylinder assembly, a piston assembly, an anchor, a drive float, and a tide compensating device. The piston assembly is operably coupled with the cylinder assembly to define an expandable chamber, a fluid inlet communicating with the chamber, and a fluid outlet communicating with the chamber, wherein fluid is drawn into the chamber through the inlet as the chamber expands and fluid is pumped out of the chamber through the outlet as the chamber contracts. The anchor is connected to an anchored one of said cylinder and piston assemblies to position said anchored one of the assemblies below the surface of the body of water and to restrict upward movement of said anchored one of the assemblies. The drive float rides on top of the body of water such that a rising wave lifts the drive float upward and a falling wave lowers the drive float downward. The drive float is coupled to a relatively moveable one of said cylinder and piston assemblies to move the same in an upward direction relative to the anchored one of the assemblies in response to a rising wave lifting the drive float. The piston and cylinder assemblies are interconnected so that the chamber contracts, to thereby pump fluid from the chamber through the outlet, during upward movement of the moveable one of the assemblies, and the chamber expands, to thereby draw fluid into the chamber through the inlet, during downward movement of the moveable one of the assemblies. Finally, the tide compensating device interconnects the drive float and moveable one of the assemblies in such a manner that the amount of upward movement of the moveable one of the assemblies is relatively less than the amount of upward movement of the drive float in response to arising wave lifting the drive float.

Another aspect of the present invention concerns an apparatus for pumping a fluid using the continuous rising and falling wave action in a body of water, the apparatus including a cylinder assembly, a piston assembly, an anchor, and a drive float. The piston assembly is operably coupled with the cylinder assembly to define an expandable chamber, a fluid inlet communicating with the chamber, and a fluid outlet communicating with the chamber, wherein fluid is drawn into the chamber through the inlet as the chamber expands and fluid is pumped out of the chamber through the outlet as the chamber contracts. The anchor is connected to an anchored one of said cylinder and piston assemblies to position said anchored one of the assemblies below the surface of the body of water and to restrict upward movement of said anchored one of the assemblies. The drive float rides on top of the body of water such that a rising wave lifts the drive float upward and a falling wave lowers the drive float downward. The drive float is coupled to a relatively moveable one of said cylinder and piston assemblies to move the same in an upward direction relative to the anchored one of the assemblies in response to a rising wave lifting the drive float. The piston and cylinder assemblies are interconnected so that the chamber contracts, to thereby pump fluid from the chamber through the outlet, during upward movement of the moveable one of the assemblies, and the chamber expands, to thereby draw fluid into the chamber through the inlet, during downward movement of the moveable one of the assemblies. The piston assembly includes a piston rod slidably coupled to the cylinder assembly to permit generally vertical relative movement therebetween. The cylinder assembly includes an alignment guide that defines in part the chamber and a central pathway. The piston rod is slidably received within the pathway. The alignment guide includes a pressure-activated seal around the pathway. The pressure-activated seal imparts approximately no drag against the piston rod when the moveable one of the assemblies moves downwardly. Finally, the pressure-activated seal is put under pressure against the piston rod as the moveable one of the assemblies moves upwardly to expel the fluid out of the cylinder, such pressure preventing fluid from exiting the chamber through the pathway.

Yet another aspect of the present invention concerns an apparatus for pumping a fluid using the continuous rising and falling wave action in a body of water, the apparatus including a cylinder assembly, a piston assembly, an anchor, and a drive float. The piston assembly is operably coupled with the cylinder assembly to define an expandable chamber, a fluid inlet communicating with the chamber, and a fluid outlet communicating with the chamber, wherein fluid is drawn into the chamber through the inlet as the chamber expands and fluid is pumped out of the chamber through the outlet as the chamber contracts. The fluid inlet includes a check valve permitting one-way fluid flow into the chamber through the inlet. The anchor is connected to an anchored one of said cylinder and piston assemblies to position said anchored one of the assemblies below the surface of the body of water and to restrict upward movement of said anchored one of the assemblies. The drive float rides on top of the body of water such that a rising wave lifts the drive float upward and a falling wave lowers the drive float downward. The drive float is coupled to a relatively moveable one of said cylinder and piston assemblies to move the same in an upward direction relative to the anchored one of the assemblies in response to a rising wave lifting the drive float. The piston and cylinder assemblies are interconnected so that the chamber contracts, to thereby pump fluid from the chamber through the outlet, during upward movement of the moveable one of the assemblies, and the chamber expands, to thereby draw fluid into the chamber through the inlet, during downward movement of the moveable one of the assemblies. The piston assembly includes a rigid support plate having a chamber-defining surface that defines in part the chamber. The support plate presents a plurality of openings that permit fluid to pass through the support plate and into the chamber. The piston assembly further includes a generally fluid impermeable cover shiftably disposed adjacent the support plate for movement into and out of a plate-sealing position, in which the plate sealingly engages the chamber-defining surface and thereby prevents fluid flow through the plate. Thus, the support plate and cover cooperatively form the fluid inlet check valve.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 2 is an elevation view of a wave powered pumping apparatus constructed in accordance with the principles of a preferred embodiment of the present invention;

Figure 5:
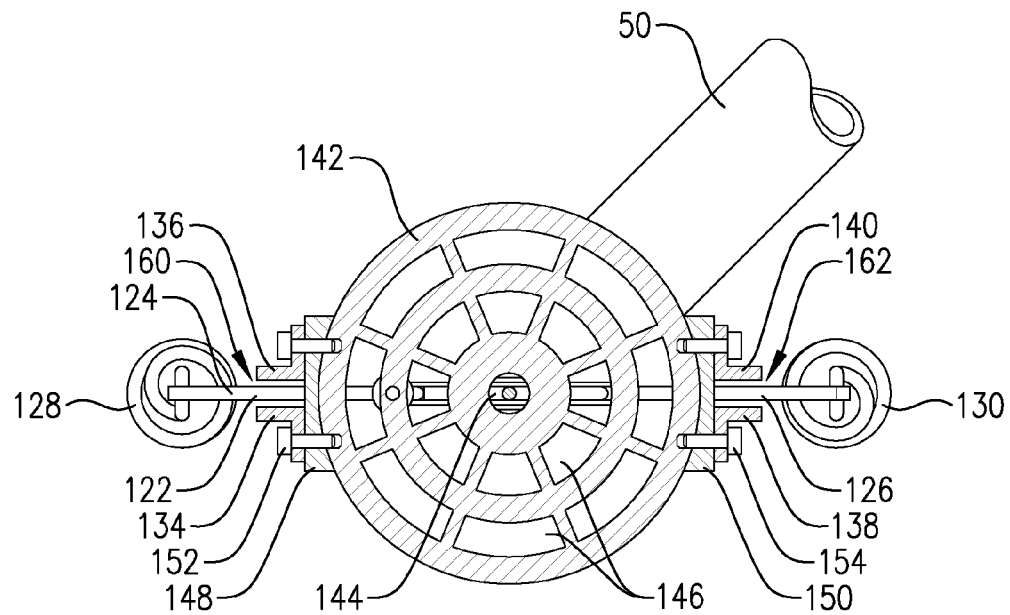
Figure 6:
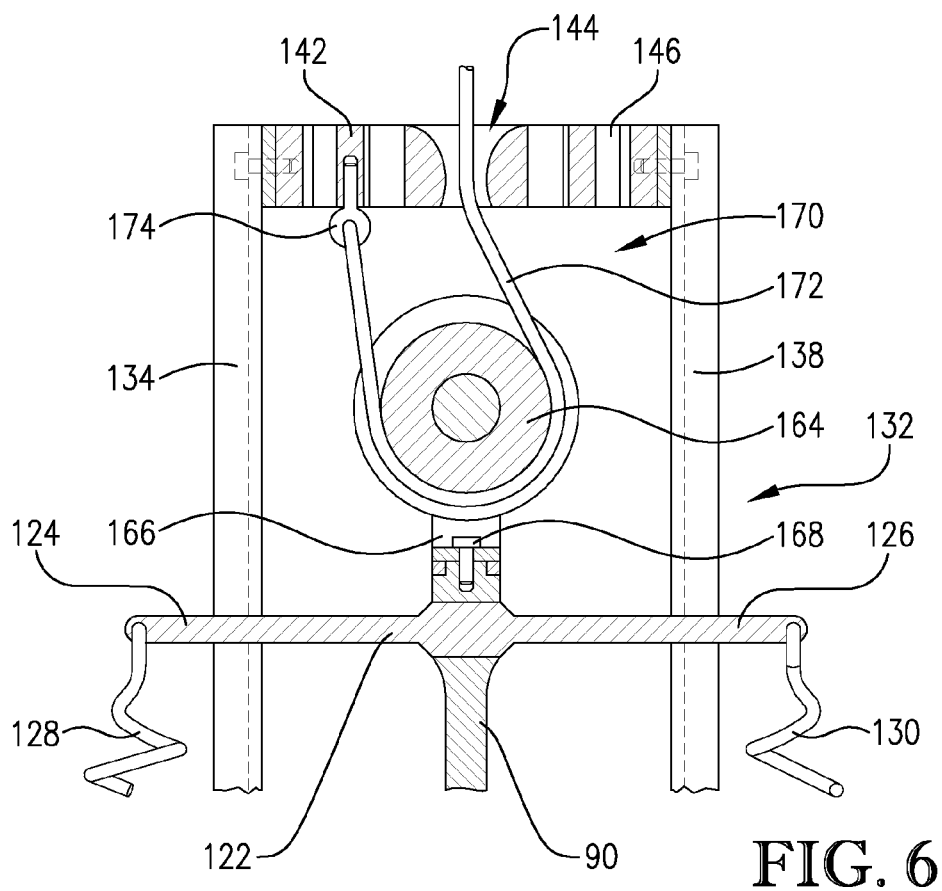
Figure 10:
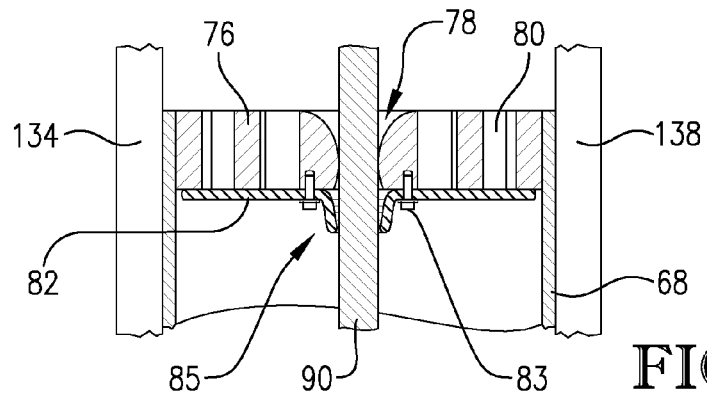
Figure 8:
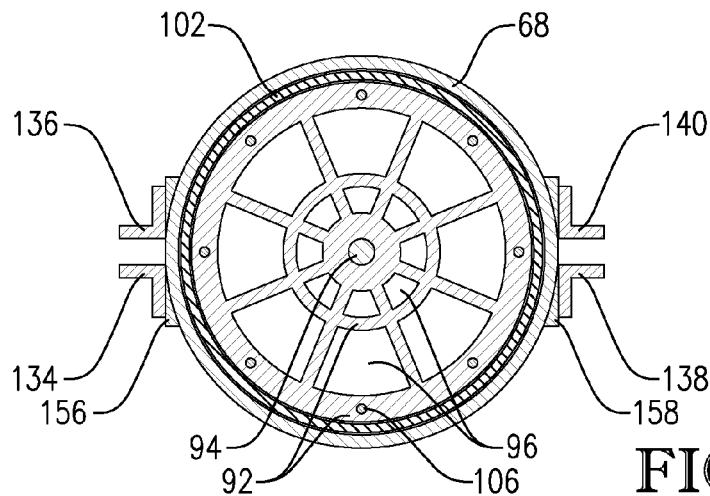
Figure 9:
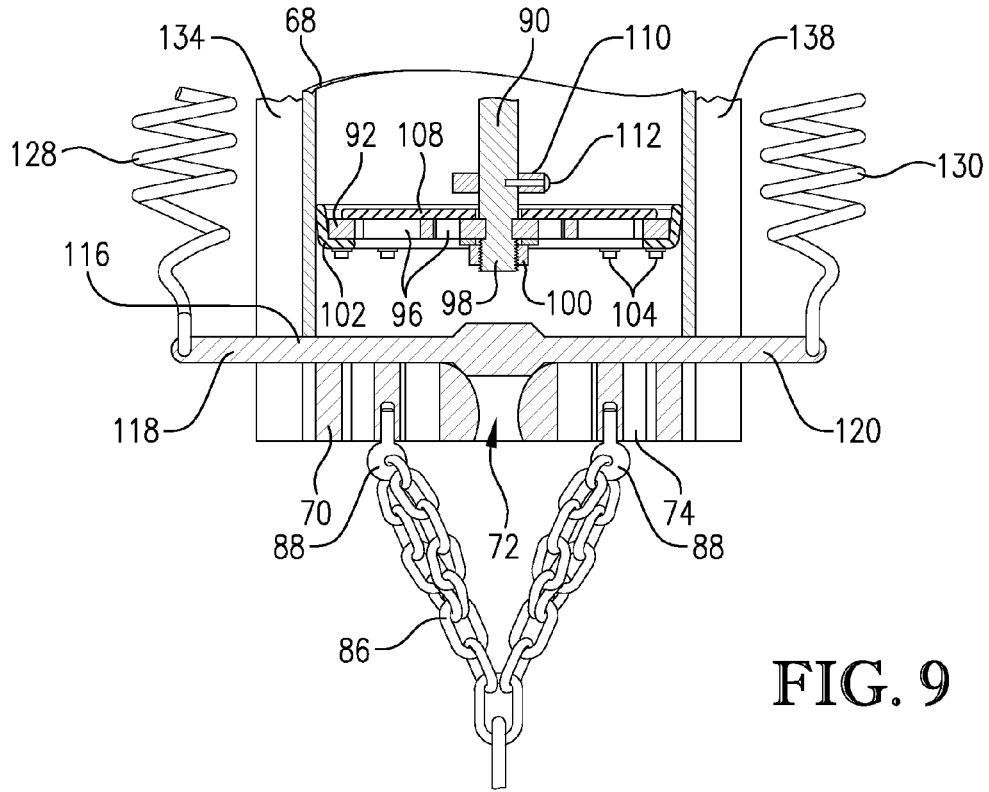

FIG. 3 is a partial side sectional view of the wave powered pumping apparatus shown in FIG. 2, particularly illustrating the structure and function of the components thereof, including a piston within a cylinder and a tide compensating device depicted in a pump reloaded position, with broken line arrows indicating the direction of flow of a fluid and solid, thick arrows indicating prospective movement of the next stage of operation of the apparatus;

FIG. 4 is a partial side sectional view of the wave powered pumping apparatus, similar to that of FIG. 3, but with the piston within the cylinder and the tide compensating device in a fluid expelling position, with broken line arrows indicating the direction of flow of a fluid and solid, thick arrows indicating prospective movement of the next stage of operation of the apparatus;

FIG. 5 is an enlarged, top sectional view of a portion of the wave powered pumping apparatus, the view taken along the line 5-5 of FIG. 2, particularly illustrating in detail a frame top plate secured to a framework of the tide compensating device, and depicting springs of a pump reload mechanism and a fluid outlet conduit;

FIG. 6 is an enlarged, fragmentary side sectional view of a top portion of the wave powered pumping apparatus in the position shown in FIG. 4, particularly illustrating in detail the tide compensating device, including part of a framework, a rotatable pulley at the top of the piston, and a cable fixed to the top of the framework and wrapped around the pulley;

FIG. 7 is a partial side sectional view of the wave powered pumping apparatus, similar to that of FIG. 4, but with the piston within the cylinder and the tide compensating device depicted in a position moving from a fluid expelling position to a pump reloaded position, with broken line arrows indicating the direction of flow of a fluid and solid, thick arrows indicating prospective movement of the next stage of operation of the apparatus;

FIG. 8 is an enlarged, top sectional view of a portion of the wave powered pumping apparatus, the view taken along the line 8-8 of FIG. 2, particularly illustrating in detail a rigid support plate of the piston with a plurality of openings therein disposed within the cylinder;

FIG. 9 is an enlarged, fragmentary side sectional view of a bottom portion of the wave powered pumping apparatus in the position shown in FIG. 3, particularly illustrating in detail a cylinder bottom plate secured to the framework of the tide compensating device, and the piston with a cover and stopper cooperating to form a fluid inlet check valve;

FIG. 10 is an enlarged, fragmentary side sectional view of an intermediate portion of the wave powered pumping apparatus in the position shown in FIG. 3, particularly illustrating in detail a cylinder top plate secured to the framework of the tide compensating device at the top of the cylinder forming an alignment guide, including a pathway for the piston rod, and a pressure-activated seal around the pathway;

FIG. 11 is a partial side sectional view of an alternative wave powered pumping apparatus constructed in accordance with the principles of a second embodiment of the present invention, similar in many respects to the wave powered pumping apparatus shown in FIG. 3, but depicting a tide compensating device in a pump reload position with additional rotating pulleys to further reduce the ratio of vertical travel of a float to vertical travel of the piston, with broken line arrows indicating the direction of flow of a fluid and solid, thick arrows indicating prospective movement of the next stage of operation of the apparatus;

FIG. 12 is a partial side sectional view of the alternative wave powered pumping apparatus of FIG. 11 and similar to the view of the same, but with the piston within the cylinder and the tide compensating device in a fluid expelling position, depicting the reduction of vertical travel of the piston relative to the float, again with broken line arrows indicating the direction of flow of a fluid and solid, thick arrows indicating prospective movement of the next stage of operation of the apparatus;

FIG. 13 is a partial side sectional view of an alternative wave powered pumping apparatus, constructed in accordance with the principles of a third embodiment of the present invention, similar in some respects to the wave powered pumping apparatus shown in FIG. 3, but depicting a piston assembly as an anchored element and a cylinder assembly as a moveable element driven upward by movement of a drive float, and a pump reload mechanism including a submerged float, tether, and pulleys to bias the apparatus in a pump reload position, with broken line arrows indicating the direction of flow of a fluid and solid, thick arrows indicating prospective movement of the next stage of operation of the apparatus; and FIG. 14 is a partial side sectional view of the alternative wave powered pumping apparatus of FIG. 13 and similar to the view of the same, but with the cylinder in a fluid expelling position, depicting movement of the submerged float where the bias of the apparatus in a pump reload position has been overcome by the upward force of the drive float on a rising wave, again with broken line arrows indicating the direction of flow of a fluid and solid, thick arrows indicating prospective movement of the next stage of operation of the apparatus.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

The present invention provides an improved float type wave powered pump that uses the continuous rising and falling wave action in a body of water to pump a fluid. The pump includes a piston assembly and a cylinder assembly configured for relative reciprocal movement therebetween. One of the assemblies is anchored to the floor and the other is vertically moveable in response to a drive float riding on a wave. Embodiments of the present invention provide a tide compensating device to reduce the ratio of vertical travel of the moveable assembly relative to vertical travel of the drive float. Embodiments of the present invention also provide a fluid inlet check valve incorporating a rigid support plate of the piston assembly with openings therein and a shiftable cover for the same to quicky reload fluid in the cylinder. Embodiments of the present invention further provide a directional pressure-activated seal at the point of sliding connection between the piston rod and the cylinder.

Figure 1:
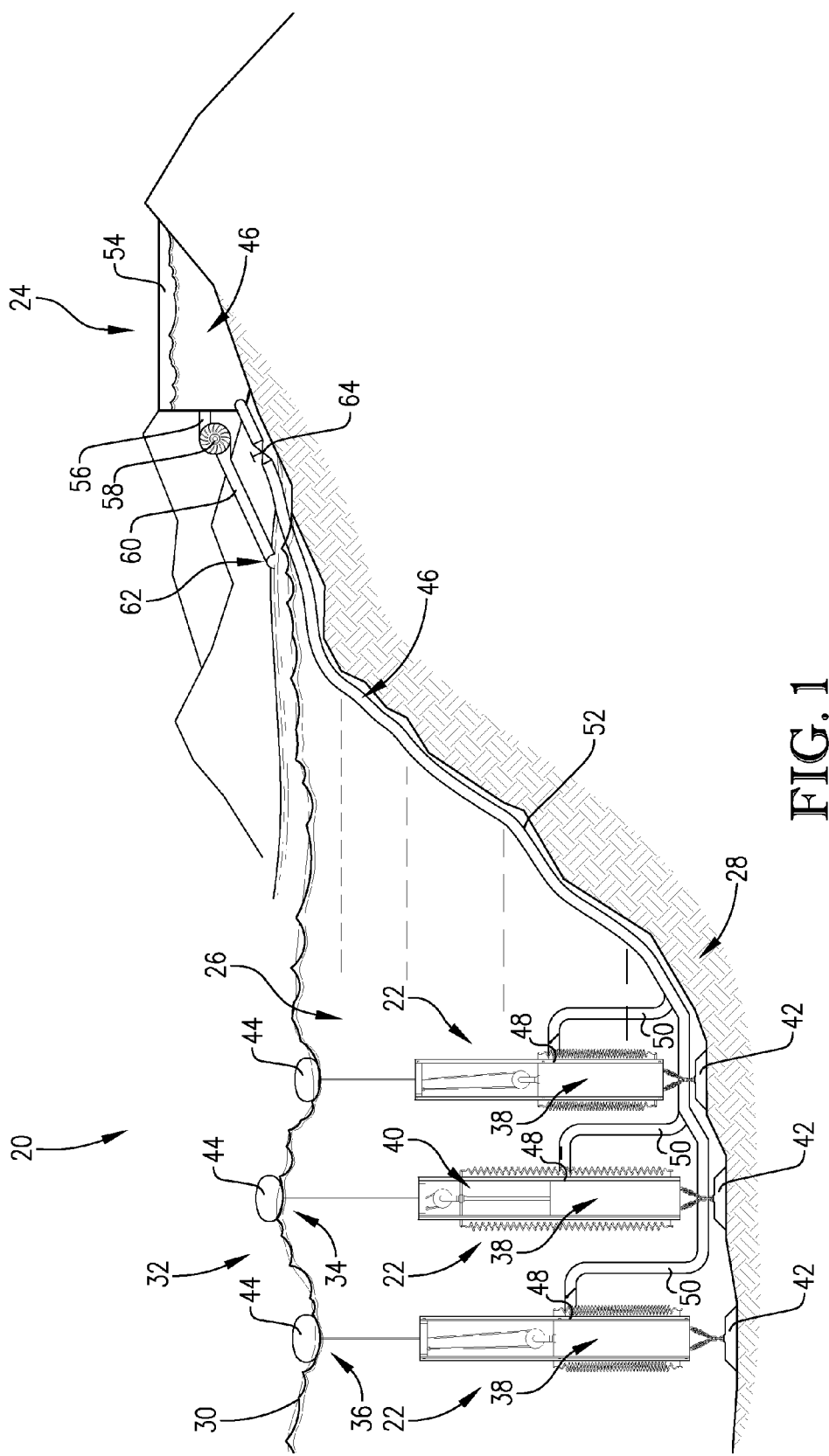
FIG. 1 is a reduced, environmental, partially schematic view of a plurality of wave powered pumping apparatuses, each constructed in accordance with the principles of a preferred embodiment of the present invention, the pumping apparatuses shown in a body of water and in fluid communication with a reservoir for holding pumped fluid.

With initial reference to FIG. 1, a wave powered energy generating system 20 selected for purposes of illustration combines a plurality of wave powered pumping apparatuses 22 and a fluid powered generating system 24. Each wave powered pumping apparatus 22 is disposed in a body of water 26. The body of water 26 extends vertically between a solid bottom surface 28 underneath the body of water 26 and a top surface 30 of the body of water 26. The top surface 30 moves up and down as a wave 32 moves across the surface top 30, as will be readily appreciated by one of ordinary skill in the art. The continuous nature of wave movement in a body of water produces a continuous change in the height of the top surface 30 of the water as a passing wave 32 moves the top surface 30 up to a crest 34, down to a trough 36, and so on, as is generally known in the art.

It is noted initially, that the environment setting depicted in FIG. 1 is provided as a contextual example only, and that the wave powered pumping apparatus of the present invention could alternatively be used in other conditions, as will be appreciated by one of ordinary skill in the art. For example, a wave powered pumping apparatus 22 could alternatively be used to provide high pressure seawater, even in excess of 800-1000 psi, to a desalinization system (not shown) or to a system for the production of hydrogen (not shown), in either gas or liquid form.

Each wave powered pumping apparatus 22 broadly includes a cylinder assembly 38 and a piston assembly 40, as will be discussed in greater detail below. In the illustrated embodiment, the cylinder assembly 38 is fixedly connected to an anchor 42 and the anchor 42 is disposed on the bottom surface 28 underneath the body of water 26. Also in the illustrated embodiment, the piston assembly 40 is moveably connected to a drive float 44 and the drive float 44 is disposed on the top surface 30 of the body of water 26. The cylinder assembly 38 and the piston assembly 40 cooperate to define an expandable chamber 37. The chamber 37 is configured to contain a working fluid 46 that is drawn into the chamber 37 upon expansion of the chamber 37 and is expelled out of the chamber 37 upon contraction of the chamber 37.

As depicted, the wave powered pumping apparatus 22 pumps the fluid 46 out of an outlet 48 in the cylinder assembly 38. In the illustrated embodiment, the fluid 46 pumped by the wave powered pumping apparatus 22 is the same as the body of water 26, although the wave powered pumping apparatus 22 could alternatively pump a different fluid through a closed-loop system without departing from the teachings of the present invention. The fluid 46 is pumped through the outlet 48 into to a conduit 50. In the illustrated embodiment, the conduits 50 of each wave powered pumping apparatus 22 converge into a main passage 52. It is noted, however, that in an alternative embodiment, each conduit 50 could extend individually, rather than converging into the main passage 52, without departing from the teachings of the present invention.

The main passage 52 transports the pumped fluid 46 to a reservoir 54 that holds the pumped fluid 46. The fluid 46 in the reservoir 54 is controllably released from a reservoir outlet 56 to power a hydroelectric generator 58 to produce useful energy, such as electricity. The fluid 46 then passes from the generator 58 to a discharge 60, where it is released through a discharge outlet 62. In the illustrated embodiment, the pumped fluid 46 is the same substance as the body of water 26 and the reservoir 54 is disposed at a location vertically above the top surface 30 of the body of water 26. Thus, as depicted in FIG. 1, the main passage 52 carries the pumped fluid 46 vertically upward to the reservoir 54. A check valve 60 in the main passage 52 prevents the pumped fluid 46 from flowing vertically downward (as motivated by gravity) back to the wave powered pumping apparatus 22. Also, as the pumped fluid 46 is the same substance as the body of water 26, the pumped fluid 46 is released from the discharge outlet 62 into the body of water 26, the discharge flow being motivated by gravity.

It will be recognized that the principles of the present invention are not limited to use with the particular power generating system 24 illustrated in FIG. 1. It will be appreciated by one of ordinary skill in the art that the exemplary power generating system could take other forms without departing from the teachings of the present invention. For example, the wave powered pumping apparatus 22 could be used to pump a fluid other than that of the body of water 26, such other working fluid being moved through a closed-loop system. It is also within the ambit of the present invention to pump the fluid to a location other than a reservoir disposed vertically higher than the body of water, as the height of the pumped fluid in the illustrated embodiment is used to allow gravitational pressure acting on the fluid released from the reservoir 54 to turn the generator 58. The wave powered pumping apparatus 22 could alternatively be used to pump fluid to another location and still use gravitational pressure acting on the fluid released from a reservoir, provided only that a discharge outlet from the reservoir is disposed at a location vertically below the reservoir outlet. It is also noted that various general aspects of power generation from wave powered pumps are described in U.S. Pat. Nos. 4,754,157 and 4,883,411 by the same inventor as the present invention, the disclosures of which are hereby incorporated by reference herein. It is further noted that the wave powered pumping apparatus 22 could alternatively be used in systems other than power generation, such as providing high pressure seawater for a desalinization system or a hydrogen production system, as discussed above.

Turning now to FIGS. 2-10, the wave powered pumping apparatus 22 broadly includes the cylinder assembly 38 and the piston assembly 40. The piston assembly 40 is configured for relative reciprocal movement within the cylinder assembly 38, as discussed briefly above, and the assemblies are coupled to define the chamber 37. In the illustrated embodiment, the cylinder assembly 38 is connected to the anchor 42, and the piston assembly 40 is connected to the drive float 44 through a tide compensating device 66, although it is clearly within the ambit of the present invention to reverse this orientation (such that a piston assembly is connected to an anchor, and a cylinder assembly is connected to a drive float). It is noted that such a configuration, which can improve pumping efficiency, is illustrated in FIGS. 13 and 14 and is discussed in greater detail below. The tide compensating device 66 is configured to reduce the amount of upward vertical movement of the piston assembly 40 relative to the amount of upward vertical movement of the drive float 44 as the drive float 44 moves upward in response to a rising wave crest 34 lifting the drive float 44, as will be discussed in more detail below. The drive float 44 is preferably, although not necessarily constructed out of dense foam or similar buoyant material and shaped generally in the form of a disc, as will be readily appreciated by one of ordinary skill in the art.

With particular reference to FIGS. 2 and 3, the cylinder assembly 38 of the illustrated embodiment includes a circular body 68 made of a section of PVC pipe or similar material. It will be appreciated by one of ordinary skill in the art that the cylinder body 68 could also take other shapes (e.g., polygonal in cross-section), or be made from other materials, without departing from the teachings of the present invention. It is noted that references to upper and lower or top and bottom refer to general relative vertical orientation of components as viewed from the vantage point of FIG. 1, corresponding to the typical orientation of the wave powered pumping apparatus 22 disposed in the body of water 26 for operation therein, as will be readily appreciated by one of ordinary skill in the art. This general orientation remains constant throughout the present detailed description to provide consistency in referring to components of the present invention.

A cylinder bottom plate 70 is fixed to the lowermost end of the cylinder body 68 and forms a bottom thereto. The cylinder bottom plate 70 includes a central hole 72 and a plurality of radially extending openings 74. The openings 74 allow the fluid 46 of the body of water 26 to flow through the cylinder bottom plate 70. Similarly, a cylinder top plate 76 is fixed to the uppermost end of the cylinder body 68 and forms a top thereto. The cylinder top plate 76 includes a central hole 78 and a plurality of radially extending openings 80. The openings 80 allow the fluid 46 of the body of water 26 to flow through the cylinder top plate 76. In the illustrated embodiment, the cylinder bottom plate 70 and the cylinder top plate 76 are the same size and shape for ease of manufacture, although such conformity is not necessary. A shiftable sealing element 82 is disposed below and generally coaxial with the cylinder top plate 76. The shiftable sealing element 82 is preferably, although not necessarily, made of leather or other tough, flexible material (such as elastomer), as will be appreciated by one or ordinary skill in the art. The shiftable sealing element 82 is attached to the cylinder top plate 76 with a plurality of fasteners 83, as illustrated in detail in FIG. 10. The portion of the sealing element 82 disposed radially outward of the fasteners 83 seals the openings 80 in the cylinder top plate 76 during pumping operation of the wave powered pumping apparatus 22, as will be discussed in greater detail below. The portion of the shiftable sealing element 82 disposed radially inward of the fasteners 83 is directed away from the central hole 78 in the cylinder top plate 76 to form a directional pressure-activated seal 85, as will be explained in greater detail below.

The cylinder assembly 38 includes the outlet 48, discussed briefly above, that allows the pumped fluid 46 to be expelled out of the cylinder assembly 38 and into the conduit 50 during pumping operation of the wave powered pumping apparatus 22. The conduit 50 includes an outlet check valve 84 that allows the pumped fluid 46 to exit the cylinder assembly 38 through the outlet 48, but not flow back into the cylinder assembly 38, as will be understood by one of ordinary skill in the art. The cylinder assembly 38 is connected to the anchor 42 with a chain 86. The chain 86 extends from the anchor 42 and is connected to a pair of eyelet fasteners 88, as depicted in greater detail in FIG. 9. Each eyelet fastener 88 is attached to the cylinder bottom plate 70 to restrict vertical movement of the cylinder assembly 38.

With continued reference to FIGS. 2 and 3, the piston assembly 40 of the illustrated embodiment includes an elongated piston rod 90 disposed in general axial alignment with the cylinder body 68. The piston rod 90 extends generally vertically lengthwise through a length of the cylinder assembly 38. At least a portion of the piston rod 90 extends sealably out of the top of the cylinder assembly 38 through the central hole 78 in the cylinder top plate 76, with the central hole 78 serving as an alignment guide for movement of the piston rod 90. Additional details of the interaction between the piston rod 90 and the cylinder top plate 76 will be discussed more thoroughly below.

The piston assembly 40 also includes a rigid support plate 92 fixed at the lower end of the piston rod 90. The rigid support plate 92 includes a central hole 94 and a plurality of radially extending openings 96, as depicted in detail in FIG. 8. The openings 96 allow the fluid 46 of the body of water 26 to flow through the rigid support plate 92. The rigid support plate 92 is attached to a threaded lower end 98 of the piston rod 90. A nut 100 is tightened on the threaded lower end 98 of the piston rod 90, below the rigid support plate 92, to fixedly connect the rigid support plate 92 to the piston rod, as depicted in detail in FIG. 9. A piston side seal 102 extends from the bottom of the rigid support plate 92 and around the sides of the rigid support plate 92 to form a generally fluid impermeable seal against the inside walls of the cylinder body 68. The piston side seal 102 is attached to the rigid support plate 92 by inserting a plurality of fasteners 104 through the piston side seal 102 and into holes 106 in the rigid support plate 92, as depicted in FIGS. 8 and 9.

A flexible flapper 108 is disposed above the rigid support plate 92 and is generally coaxial with the same. The flexible flapper 108 is preferably, although not necessarily, made of leather or other tough, flexible material (such as elastomer), as will be appreciated by one or ordinary skill in the art. In the illustrated embodiment, the flexible flapper 108 is made of the same leather material as the shiftable sealing element 82 for ease of manufacture. The flexible flapper 108 is made of a generally fluid impermeable material such that, when the flexible flapper 108 is pressed downward against the rigid support plate 92, the fluid 46 in the chamber 37 does not flow out of the plurality of openings 98 in the rigid support plate 92. The flexible flapper 108 can shift out of the way of the plurality of openings 98 in the rigid support plate 92 when the flexible flapper 108 is not pressed downward against the rigid support plate 92. During such shifting, the fluid 46 of the body of water 26 can flow through the plurality of openings 98 in the rigid support plate 92 and into the chamber 37, as will be discussed in greater detail below.

A stopper 110 is attached to the piston rod 90 at a location axially above the flexible flapper 108. A fastener 112, such as a bolt, connects the stopper 110 to the piston rod 90. The stopper 110 prevents the flexible flapper 108 from shifting axially upward along the piston rod 90 past the position of the stopper 110. The stopper 110 also maintains the central portion of the flexible flapper 108 nearest the piston rod 90 in generally close proximity to the rigid support plate 92.

Returning now to FIGS. 2 and 3, a piston reloading mechanism 114 is depicted for biasing the piston in the downward, or reload, position, the significance of which will be discussed in more detail in the operation description below. A lower spring support 116 is fixed to the top of the cylinder bottom plate 70. The lower spring support 116 includes opposed ends 118 and 120 that extend radially outward to a disposition outside of the cylinder body 68. Similarly, an upper spring support 122 is disposed above the top of the cylinder top plate 76 and is connected to the upper end of the piston rod 90 for movement therewith. The upper spring support 122 includes opposed ends 124 and 126 that extend radially outward to a disposition outside of the cylinder body 68. In the illustrated embodiment, the lower spring support 116 and the upper spring support 122 are the same size and shape for ease of manufacture, although such conformity is not necessary.

A pair of springs 128 and 130 extend between the lower spring support 116 and the upper spring support 122 on the outside of the cylinder body 68. More specifically, an extension spring 128 extends generally parallel to the axis of the cylinder body 68 from a connection at the end 118 of the lower spring support 116 to a connection at the end 124 of the upper spring support 122. Similarly, an extension spring 130 extends generally parallel to the axis of the cylinder body 68 from a connection at the end 120 of the lower spring support 116 to a connection at the end 126 of the upper spring support 122.

In brief, the piston reloading mechanism 114 provides a downward force to bias the piston assembly 40 in the downward direction, with such downward force being overcome by an upward force as the piston assembly 40 moves upward to expel fluid out of the chamber 37. The springs 128 and 130 preferably, although not necessarily, collectively provide a downward bias force that is approximately ten to twenty percent of the upward buoyant force created by the drive float 44. The downward bias force provided by the springs 128 and 130 can be changed by using alternative springs having a different spring constant, as will be understood by one of ordinary skill in the art. In the absence of an upward force, the piston reloading mechanism 114 return the piston assembly 40 back to the downward position following the fluid expulsion, as will be readily appreciated by one of ordinary skill in the art.

It is noted that it is within the ambit of the present invention for the piston reloading mechanism 114 to alternatively comprise another construction, such as a weight and tether. It is further noted that the piston reloading mechanism 114 cooperates with the drive float 44 to provide and maintain a controlled motion of the piston assembly 40. This controlled motion of the piston assembly 40 makes the wave powered pumping apparatus 22 essentially storm resistant. Specifically, the illustrated configuration is particularly useful in eliminating so-called "hammering" of the apparatus, which would otherwise occur in oceanic storms, as will be appreciated by one of ordinary skill in the art.

With continued reference to FIGS. 2 and 3, the tide compensating device 66 interconnects the drive float 44 and the piston assembly 40 such that the amount of upward movement of the piston assembly 40 is relatively less than the amount of upward movement of the drive float 44 as the drive float 44 moves upward in response to a rising wave crest 34 lifting the drive float 44, as will be discussed in more detail below. As depicted, the tide compensating device 66 includes a framework 132 that extends generally parallel to the axis of the cylinder body 68 and is disposed on the outside of the cylinder body 68. The framework 132 includes a first pair of frame members 134 and 136 disposed on one side of the cylinder body 68 and a second pair of frame members 138 and 140 disposed on another side of the cylinder body 68, as depicted particularly in the top down sectional view of FIG. 5. In the illustrated embodiment, each of the frame members 134, 136, 138, and 140 have the same height, the height being approximately twice that of the height of the cylinder body 68. The frame members 134, 136, 138, and 140 are disposed in alignment with the cylinder bottom plate 70 and extend upwardly along the sides of the cylinder body 68 to a top portion above the cylinder top plate 76.

The frame members 134, 136, 138, and 140 are connected at the top portion with a frame top plate 142. The frame top plate 142 is fixed to the uppermost ends of the frame members 134, 136, 138, and 140 and forms a top thereto. The frame top plate 142 includes a central hole 144 and a plurality of radially extending openings 146. The openings 146 allow the fluid 46 of the body of water 26 to flow through the frame top plate 142. In the illustrated embodiment, the frame top plate 142 is the same size and shape as the cylinder bottom plate 70 and the cylinder top plate 76 for ease of manufacture, although such conformity is not necessary.

As depicted in FIG. 5, the frame members 134, 136, 138, and 140 are connected to the frame top plate 142 with spacers 148 and 150 and fasteners 152 and 154, as will be readily understood by one of ordinary skill in the art. Similarly, the frame members 134, 136, 138, and 140 are also connected to the cylinder top plate 76 and the cylinder bottom plate 70 with similar spacers 156 and 158 and fasteners (not shown), as depicted generally in FIG. 8. The positioning of the pair of frame members 134 and 136 presents a vertical slot 160 between the frame members 134 and 136. Similarly, the positioning of the pair of frame members 138 and 140 presents a vertical slot 162 between the frame members 138 and 140. These slots 160 and 162 provide alignment paths for the vertical travel of the upper spring support 122, as depicted in FIGS. 5 and 8. It will be appreciated by one of ordinary skill in the art that these slots 160 and 162 maintain the upper spring support 122 in general alignment with the lower spring support 116 while the upper spring support 122 moves up and down during operation of the wave powered pumping apparatus 22.

A pulley 164 is disposed above the top of the upper spring support 122 and is housed in a bracket 166 The bracket 166 is connected to the upper end of the piston rod 90 with a fastener 168 for generally vertical movement therewith. As depicted in FIGS. 2 and 3, the pulley 164 is disposed within a space 170 defined by the frame members 134, 136, 138, and 140 on the sides, the upper spring support 122 on the bottom, and the frame top plate 142 on the top. A cable 172 is connected to a cable fastening eyelet 174. The cable fastening eyelet 174 is attached to the frame top plate 142. The cable 172 extends from the cable fastening eyelet 174, downward within the space 170 around the pulley 164, upward through the space 170, through the central hole 144 in the frame top plate 142, and is fixed at its other end to the drive float 44. In the illustrated embodiment, where one end of the cable 172 are attached to the top of the frame top plate 142, the upward movement of the piston assembly 40 is approximately one half of the distance of the upward movement of the drive float 44 during operation. It is also noted that the framework 132 could be alternatively constructed without departing from the teachings of the present invention; so long as a fixed connection is available for the one end of the cable 172 to be attached to a portion of the framework 132 above the pulley 164 as the chamber 37 expands and contracts with the pulley 164 connected to the piston assembly 40 for travel therewith.

The operation of the wave powered pumping apparatus 22 should be evident from the foregoing description. Initially, the wave powered pumping apparatus 22 is placed in a body of water 26. In the illustrated embodiment, the anchor 42 is connected to the cylinder assembly 38 and disposed on the bottom surface 28, while the drive float 44 is connected to the piston assembly 40 and disposed on the top surface 30, as depicted in FIGS. 2 and 3. As a passing wave 32 moves by the wave powered pumping apparatus 22, the crest 34 of the wave 32 causes the drive float 44 to rise up. The rising of the drive float 44 pulls the cable 172 upward, which shortens the length of the cable 172 in the space 170 of the framework 132 of the tide compensating device 66. As the length of the cable 172 in the space 170 shortens, the pulley 164 moves upward, pulling the piston assembly 40 upward, the upward movement of the piston assembly 40 being less than the upward movement of the drive float 44.

As the piston assembly 40 moves upward from the position depicted in FIG. 3 to the position depicted in FIG. 4, the flexible flapper 108 is pressed against the piston rigid support plate 92, sealing the openings 96. This upward movement of the piston assembly 40 pushes the fluid 46 within the chamber 37 out of the compacting chamber 37 through the outlet 48. Also as the piston assembly 40 moves upward from the position depicted in FIG. 3 to the position depicted in FIG. 4, the upper spring support 122 moves upward through the slots 160 and 162 formed by the frame members 134, 136, 138, and 140. This upward movement of the upper spring support 122 causes the springs 128 and 130 to stretch, storing energy to bias the piston in the downward position of FIG. 3. Additionally, as the piston assembly 40 moves upward from the position depicted in FIG. 3 to the position depicted in FIG. 4, the pressure generated by the fluid 46 being pushed out of the compacting chamber 37 causes the directional pressure-activated seal 85 to bear radially inwardly against the piston rod 90 to prevent the fluid 46 from exiting the chamber 37 through the central hole 78 in the cylinder top plate 76. Moreover, the pressure generated by the fluid 46 being pushed out of the compacting chamber 37 causes the shiftable seal 82 to push upward against the cylinder top plate 76 and thereby seal the plurality of openings 80 in the cylinder top plate 76 against fluid exit through the cylinder top plate 76.

As the passing wave 32 moves beyond the wave powered pumping apparatus 22, the trough 36 of the wave 32 allows the drive float 44 to fall back downward. The downward bias of the stretched springs 128 and 130 pulls the upper spring support 122 downward through the slots 160 and 162, which also moves the piston assembly 40 downward from the position depicted in FIG. 4 to the position depicted in FIG. 3, with the intermediate downward moving position depicted in FIG. 7.

As the piston assembly 40 moves downward, the flexible flapper 108 shifts and/or flexes upward relative to the piston rigid support plate 92 and is held in place by the stopper 110. The shifting of the flexible flapper 108 allows fluid 46 from the body of water 26 to flow through the openings 74 in the cylinder bottom plate 70, through the openings 96 in the piston rigid support plate 92, around the shifted flexible flapper 108, and into the expanding chamber 37 to reload the cylinder assembly 38 with additional fluid 46, as depicted in detail in FIG. 7. Also, as the piston assembly 40 moves downward, the pumped fluid is prevented from re-entering the chamber 37 by the check valve 84 in the conduit 50. Additionally, as the piston assembly 40 moves downward, the directional pressure-activated seal 85 is relaxed and imparts virtually no drag force axially upon the piston rod 90 as the piston rod 90 moves through the central hole 78 of the cylinder top plate 76 aligned with the disposition of the seal directional pressure-activated 85, as depicted in FIG. 10. When the piston assembly 40 returns to the downward position of FIG. 3, the upper spring support 122 rests on the cylinder top plate 76 to prevent further downward movement of the piston assembly 40.

As another wave crest moves past the wave powered pumping apparatus 22 to cause the drive float 44 to rise up, the wave powered pumping apparatus 22 is in the reloaded condition, depicted in FIG. 3, and the pumping process described above is repeated. This repeated pumping process continuously pumps fluid 46 into the reservoir 54 to generate electricity, as described above.

With reference now to FIGS. 11 and 12, a second embodiment of a wave powered pumping apparatus 222 is depicted, wherein a similar cylinder assembly 238 and piston assembly 240 are combined with an anchor 242 and a drive float 244. The wave powered pumping apparatus 222 is very similar to the wave powered pumping apparatus 22, with similar components between the two being numbered in similar fashion, but differing by an order of two hundred. Therefore, for the sake of brevity, only the components unique to this alternative embodiment of the wave powered pumping apparatus 222 will be described in detail.

A tide compensating device 266 interconnects the drive float 244 and the piston assembly 240 such that the amount of the upward movement of the piston assembly 240 is approximately one quarter of the amount of upward movement of the drive float 244. A framework 332 extends around and above the cylinder body 268 and is connected at the top with a frame top plate 342. A pulley 364 is disposed above the top of an upper spring support 322 and is housed in a bracket 366. The bracket 366 is connected to the upper end of a piston rod 290 with a fastener 368 for generally vertical movement therewith. As depicted in FIGS. 11 and 12, the pulley 364 is disposed within a space 370 defined by the framework 332 on the sides, the upper spring support 322 on the bottom, and the frame top plate 342 on the top. A second pulley 376 is disposed at the top of the space 370 and is housed in a bracket 378 connected to the frame top plate 342 with a fastener 380 so as to not move vertically. A third pulley 382 is coaxial with the first pulley 364 and is housed in the same bracket 366. A cable 372 is connected to a cable fastening eyelet 374 connected to the frame top plate 342. The cable 372 extends from the cable fastening eyelet 374, downward within the space 370 and around the first pulley 364, upward though the space 370 and around the second pulley 376, back downward through the space 370 and around the third pulley 382, back upward through the space 370 and through a central hole 344 in the frame top plate 342, and is fixed at its other end to the drive float 344.

Thus, the operation of the alternative embodiment of the wave powered pumping apparatus 222 is also similar in many ways to the operation described above for the wave powered pumping apparatus 22, with an exception. As a passing wave (not shown in detail) moves by the wave powered pumping apparatus 222, a crest 234 of the wave causes the drive float 244 to rise up, pulling the cable 372 upward, and shortening the length of the cable 372 in the space 370 of the framework 332 of the tide compensating device 266. As the length of the cable 372 in the space 370 shortens, the first pulley 364 and the third pulley 382 move upward, moving the piston assembly 240 upward also, with the amount of the upward movement of the piston assembly 240 being about one quarter of the amount of the upward movement of the drive float, as will be readily understood by one of ordinary skill in the art upon review of FIGS. 11 and 12.

With reference now to FIGS. 13 and 14, a third embodiment of a wave powered pumping apparatus 422 is depicted, wherein a similar cylinder assembly 438 and piston assembly 440 are combined with an anchor 442 and a drive float 444 in the opposite configuration of apparatus 22, such that the piston assembly 440 is connected to the anchor 442 to restrict vertical movement thereof, and the cylinder assembly 438 is connected to the drive float 444 for reciprocal upward movement about the piston assembly 438. The cylinder assembly 438 and the piston assembly 440 cooperatively define an expanding chamber 437, similar in many respects to the chamber 37 disclosed above. It is noted that this configuration, wherein the piston assembly 438 is the anchored component, can improve pumping efficiency of the wave powered pumping apparatus 422. With the exception of the configuration of the anchored assembly comprising the piston assembly 438 and the moveable assembly comprising the cylinder assembly 440, the wave powered pumping apparatus 422 is very similar to the illustrated wave powered pumping apparatus 22, with similar components between the two being numbered in similar fashion, but differing by an order of four hundred. Therefore, for the sake of brevity, only the components unique to this alternative embodiment of the wave powered pumping apparatus 422 will be described in detail.

A chain 486 connects the anchor 442 to a piston rod 490 at an eyelet fastener 488 to prevent upward movement thereof. A piston rigid support plate 492 is fixed at the upper end of the piston rod 490 and includes a plurality of radially extending openings 496. A piston side seal 502 is attached in a similar manner as in the embodiment described above, but with the opposite vertical orientation, such construction being readily understood by one of ordinary skill in the art upon review of the above description of FIGS. 2-10. A flexible flapper 508 and a stopper 510 are also similarly disposed with the opposite vertical orientation to form an inlet check valve part of the piston assembly 440.

Also similar to the embodiment disclosed above, a cable 572 connects the drive float 444 to the cylinder assembly 438 to provide upward movement thereof. The cylinder assembly includes a body 468 and a plate 476 at the bottom end thereof. The plate 476 has a central hole 478 and radially extending openings 480 cooperating with a shiftable seal 482, similar in construction to the embodiment described above, but also with the opposite vertical orientation, such construction being readily understood by one of ordinary skill in the art upon review of the above description of FIGS. 2-10.

The cylinder assembly 438 also includes a reload mechanism 514 to bias the cylinder assembly 438 in the downward direction. The cylinder reload mechanism 514 includes a first pulley 576, disposed above the top of the piston rod 490, and a second pulley 578 disposed below the first pulley 576. As depicted, the first pulley 576 is connected to the top of to cylinder assembly 438 and the second pulley 578 is housed in a bracket 580 that is connected to the bottom of the cylinder assembly 438. A cable 582 is connected to the top of the piston rod 490 and extends up and around the first pulley 576, down and around the second pulley 578, and up to a submerged float 584. The submerged float 584 is configured to provide an upward buoyant force that is less than the upward buoyant force created by the drive float 444. The submerged float 584 preferably, although not necessarily, provides an upward buoyant force that is approximately ten to twenty percent of the upward buoyant force created by the drive float 444, such as by using a smaller float of the same material for the submerged float 584 compared to the drive float 444 or by using a different material, as will be understood by one of ordinary skill in the art. The submerged float 584 exerts the upward buoyant force that is transmitted through the cable to provide a downward bias on the cylinder assembly 438, as will be readily understood by one of ordinary skill in the art.

The operation of this embodiment of the wave powered pumping apparatus 422 is also similar in many ways to the operation described above for the wave powered pumping apparatus 22, but with the cylinder assembly 438 being upwardly moveable with the passing of a wave and the piston assembly remaining fixed to the anchor 442. Other details of the operation of this embodiment will be readily understood by one of ordinary skill in the art upon review of the above description regarding the embodiment of FIGS. 2-10. In addition, it is noted that the wave powered pumping apparatus 422 is depicted without a tide compensating device similar to that of the embodiments previously described, although it will be readily appreciated by one of ordinary skill in the art that it is clearly within the ambit of the present invention to incorporate such a device for use with this embodiment.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. An apparatus for pumping a fluid using the continuous rising and falling wave action in a body of water, said apparatus comprising:
   a cylinder assembly;
   a piston assembly operably coupled with the cylinder assembly to define an expandable chamber, a fluid inlet communicating with the chamber, and a fluid outlet communicating with the chamber, wherein fluid is drawn into the chamber through the inlet as the chamber expands and fluid is pumped out of the chamber through the outlet as the chamber contracts;
   an anchor connected to an anchored one of said cylinder and piston assemblies to position said anchored one of the assemblies below the surface of the body of water and to restrict upward movement of said anchored one of the assemblies;
   a drive float riding on top of the body of water such that a rising wave lifts the drive float upward and a falling wave lowers the drive float downward,
   said drive float being coupled to a relatively moveable one of said cylinder and piston assemblies to move the same in an upward direction relative to the anchored one of the assemblies in response to a rising wave lifting the drive float, said piston and cylinder assemblies being interconnected so that the chamber contracts, to thereby pump fluid from the chamber through the outlet, during upward movement of the moveable one of the assemblies, and the chamber expands, to thereby draw fluid into the chamber through the inlet, during downward movement of the moveable one of the assemblies; and a pump reload mechanism operably coupled to the moveable one of the assemblies to yieldably bias the same in a downward direction relative to the anchored one of the assemblies so as to facilitate drawing of fluid into the chamber in response to a falling wave permitting the drive float to lower, said pump reload mechanism comprising a submerged float and a tether connecting the submerged float to the moveable one of the assemblies so that the buoyancy of the submerged float is transferred through the tether as a downward return force bias on the moveable one of the assemblies, with the upward force provided by the buoyancy of the drive float being greater than the downward force bias, permitting the moveable one of the assemblies to move upwardly in response to the rising wave lifting the drive float.

2. The apparatus as claimed in claim 1,
said pump reload mechanism including first and second direction-switching members,
said direction-switching members being connected to the moveable one of the assemblies, with the second direction-switching member disposed vertically below the first direction-switching member,
said tether extending upwardly from the anchored one of the assemblies, around the first direction-switching member, down and around the second direction-switching member, and up to the submerged float such that the upward force provided by the buoyancy of the submerged float provides the downward return force bias.

3. The apparatus as claimed in claim 1,
said submerged float configured to provide said buoyant force of approximately between ten and twenty percent of the upward force provided by the buoyancy of the drive float.

4. The apparatus as claimed in claim 1,
said fluid inlet including a check valve permitting one-way fluid flow into the chamber through the inlet.

5. The apparatus as claimed in claim 4,
said fluid outlet including a check valve permitting one-way fluid flow out of the chamber through the outlet.

6. The apparatus as claimed in claim 4,
said piston assembly including a rigid support plate having a chamber-defining surface that defines in part the chamber,
said support plate presenting a plurality of openings that permit fluid to pass through the support plate and into the chamber,
said piston assembly further including a generally fluid impermeable cover shiftably disposed adjacent the support plate for movement into and out of a plate-sealing position, in which the plate sealingly engages the chamber-defining surface and thereby prevents fluid flow through the plate,
said support plate and cover cooperatively forming the fluid inlet check valve.

7. The apparatus as claimed in claim 6,
said piston assembly including a piston rod slidably coupled to the cylinder assembly to permit generally vertical relative movement therebetween,
said support plate being carried on the piston rod,
said cover being flexible and vertically moveable along the piston rod,
said piston assembly including a stopper fixed to the piston rod adjacent the cover opposite the support plate so as to limit movement of the cover away from the support plate.

8. The apparatus as claimed in claim 7,
said cylinder assembly including an alignment guide that defines in part the chamber and a central pathway,
said piston rod being slidably received within the pathway,
said alignment guide including a pressure-activated seal around the pathway,
said pressure-activated seal imparting approximately no drag against the piston rod when the moveable one of the assemblies moves downwardly,
said pressure-activated seal being put under pressure against the piston rod as the moveable one of the assemblies moves upwardly to expel the fluid out of the cylinder, such pressure preventing fluid from exiting the chamber through the pathway.

9. The apparatus as claimed in claim 8,
said anchor being operably connected to the piston assembly, such that the piston assembly is the anchored one of the cylinder and piston assemblies,
said drive float being operably connected to the cylinder assembly, such that the cylinder assembly is relatively moveable one of the cylinder and piston assemblies.

10. The apparatus as claimed in claim 1; and
a tide compensating device interconnecting the drive float and moveable one of the assemblies in such a manner that the amount of upward movement of the moveable one of the assemblies is relatively less than the amount of upward movement of the drive float in response to a rising wave lifting the drive float.

11. The apparatus as claimed in claim 10,
said tide compensating device comprising a framework fixed to the anchored one of the assemblies, a flexible element interconnecting the moveable one of the assemblies and the drive float, and a first rotatable member connected to the moveable one of the assemblies,
said flexible element extending from a fixed connection on the framework that is spaced above the first rotatable member as the chamber expands and contracts,
said flexible element extending downwardly from the fixed connection, around the first rotatable member, and up to the drive float, causing the moveable one of the assemblies to move upward a distance less than that moved by the drive float as a rising wave lifts the drive float.

12. The apparatus as claimed in claim 1,
said anchor being operably connected to the piston assembly, such that the piston assembly is the anchored one of the cylinder and piston assemblies,
said drive float being operably connected to the cylinder assembly, such that the cylinder assembly is relatively moveable one of the cylinder and piston assemblies.

13. An apparatus for pumping a fluid using the continuous rising and falling wave action in a body of water, said apparatus comprising:
a cylinder assembly;
a piston assembly operably coupled with the cylinder assembly to define an expandable chamber, a fluid inlet communicating with the chamber, and a fluid outlet communicating with the chamber, wherein fluid is drawn into the chamber through the inlet as the chamber expands and fluid is pumped out of the chamber through the outlet as the chamber contracts;

an anchor connected to an anchored one of said cylinder and piston assemblies to position said anchored one of the assemblies below the surface of the body of water and to restrict upward movement of said anchored one of the assemblies;
a drive float riding on top of the body of water such that a rising wave lifts the drive float upward and a falling wave lowers the drive float downward,
said drive float being coupled to a relatively moveable one of said cylinder and piston assemblies to move the same in an upward direction relative to the anchored one of the assemblies in response to a rising wave lifting the drive float,
said piston and cylinder assemblies being interconnected so that the chamber contracts, to thereby pump fluid from the chamber through the outlet, during upward movement of the moveable one of the assemblies, and the chamber expands, to thereby draw fluid into the chamber through the inlet, during downward movement of the moveable one of the assemblies,
said piston assembly including a piston rod slidably coupled to the cylinder assembly to permit generally vertical relative movement therebetween,
said cylinder assembly including an alignment guide that defines in part the chamber and a central pathway,
said piston rod being slidably received within the pathway,
said alignment guide including a pressure-activated seal around the pathway,
said pressure-activated seal imparting approximately no drag against the piston rod when the moveable one of the assemblies moves downwardly,
said pressure-activated seal being put under pressure against the piston rod as the moveable one of the assemblies moves upwardly to expel the fluid out of the cylinder, such pressure preventing fluid from exiting the chamber through the pathway; and
a pump reload mechanism operably coupled to the moveable one of the assemblies to yieldably bias the same in a downward direction relative to the anchored one of the assemblies so as to facilitate drawing of fluid into the chamber in response to a falling wave permitting the drive float to lower,
said pump reload mechanism comprising a submerged float and a tether connecting the submerged float to the moveable one of the assemblies so that the buoyancy of the submerged float is transferred through the tether as a downward return force bias on the moveable one of the assemblies, with the upward force provided by the buoyancy of the drive float being greater than the downward force bias, permitting the moveable one of the assemblies to move upwardly in response to the rising wave lifting the drive float.

14. The apparatus as claimed in claim 13,
said fluid inlet including a check valve permitting one-way fluid flow into the chamber through the inlet,
said fluid outlet including a check valve permitting one-way fluid flow out of the chamber through the outlet.

15. The apparatus as claimed in claim 14,
said piston assembly including a rigid support plate having a chamber-defining surface that defines in part the chamber,
said support plate presenting a plurality of openings that permit fluid to pass through the support plate and into the chamber,
said piston assembly further including a generally fluid impermeable cover shiftably disposed adjacent the support plate for movement into and out of a plate-sealing position, in which the plate sealingly engages the chamber-defining surface and thereby prevents fluid flow through the plate,
said support plate and cover cooperatively forming the fluid inlet check valve.

16. The apparatus as claimed in claim 13; and
a tide compensating device interconnecting the drive float and moveable one of the assemblies in such a manner that the amount of upward movement of the moveable one of the assemblies is relatively less than the amount of upward movement of the drive float in response to a rising wave lifting the drive float.

17. The apparatus as claimed in claim 13,
said anchor being operably connected to the piston assembly, such that the piston assembly is the anchored one of the cylinder and piston assemblies,
said drive float being operably connected to the cylinder assembly, such that the cylinder assembly is relatively moveable one of the cylinder and piston assemblies.

18. An apparatus for pumping a fluid using the continuous rising and falling wave action in a body of water, said apparatus comprising:
a cylinder assembly;
a piston assembly operably coupled with the cylinder assembly to define an expandable chamber, a fluid inlet communicating with the chamber, and a fluid outlet communicating with the chamber, wherein fluid is drawn into the chamber through the inlet as the chamber expands and fluid is pumped out of the chamber through the outlet as the chamber contracts,
said fluid inlet including a check valve permitting one-way fluid flow into the chamber through the inlet;
an anchor connected to an anchored one of said cylinder and piston assemblies to position said anchored one of the assemblies below the surface of the body of water and to restrict upward movement of said anchored one of the assemblies;
a drive float riding on top of the body of water such that a rising wave lifts the drive float upward and a falling wave lowers the drive float downward,
said drive float being coupled to a relatively moveable one of said cylinder and piston assemblies to move the same in an upward direction relative to the anchored one of the assemblies in response to a rising wave lifting the drive float,
said piston and cylinder assemblies being interconnected so that the chamber contracts, to thereby pump fluid from the chamber through the outlet, during upward movement of the moveable one of the assemblies, and the chamber expands, to thereby draw fluid into the chamber through the inlet, during downward movement of the moveable one of the assemblies,
said piston assembly including a rigid support plate having a chamber-defining surface that defines in part the chamber,
said support plate presenting a plurality of openings that permit fluid to pass through the support plate and into the chamber,
said piston assembly further including a generally fluid impermeable cover shiftably disposed adjacent the support plate for movement into and out of a plate-sealing position, in which the plate sealingly engages the chamber-defining surface and thereby prevents fluid flow through the plate,
said support plate and cover cooperatively forming the fluid inlet check valve; and a pump reload mechanism operably coupled to the moveable one of the assemblies to yieldably bias the same in a downward direction relative to the anchored one of the assemblies so as to facilitate drawing of fluid into the chamber in response to a falling wave permitting the drive float to lower, said pump reload mechanism comprising a submerged float and a tether connecting the submerged float to the moveable one of the assemblies so that the buoyancy of the submerged float is transferred through the tether as a downward return force bias on the moveable one of the assemblies, with the upward force provided by the buoyancy of the drive float being greater than the downward force bias, permitting the moveable one of the assemblies to move upwardly in response to the rising wave lifting the drive float.

19. The apparatus as claimed in claim 18, said piston assembly including a piston rod slidably coupled to the cylinder assembly to permit generally vertical relative movement therebetween, said cylinder assembly including an alignment guide that defines in part the chamber and a central pathway, said piston rod being slidably received within the pathway, said alignment guide including a pressure-activated seal around the pathway, said pressure-activated seal imparting approximately no drag against the piston rod when the moveable one of the assemblies moves downwardly, said pressure-activated seal being put under pressure against the piston rod as the moveable one of the assemblies moves upwardly to expel the fluid out of the cylinder, such pressure preventing fluid from exiting the chamber through the pathway.

20. The apparatus as claimed in claim 18, said anchor being operably connected to the piston assembly, such that the piston assembly is the anchored one of the cylinder and piston assemblies, said drive float being operably connected to the cylinder assembly, such that the cylinder assembly is relatively moveable one of the cylinder and piston assemblies.

* * * * *